United States Patent [19]

Yamada

[11] Patent Number: 5,953,461
[45] Date of Patent: Sep. 14, 1999

[54] IMAGE EMPHASIS PROCESSING METHOD AND APPARATUS

[75] Inventor: Masahiko Yamada, Kaisei-machi, Japan

[73] Assignee: Fuji Photo Film Co., Ltd., Kanagawa-ken, Japan

[21] Appl. No.: 08/912,341

[22] Filed: Aug. 18, 1997

[30] Foreign Application Priority Data

Aug. 16, 1996 [JP] Japan ................................ 8-216330

[51] Int. Cl.$^6$ .................................................. G06T 5/00
[52] U.S. Cl. .......................................... 382/266; 382/132
[58] Field of Search ................................ 382/266, 269, 382/260, 261, 263, 264, 254, 132

[56] References Cited

U.S. PATENT DOCUMENTS

| | | |
|---|---|---|
| 4,315,318 | 2/1982 | Kato et al. . |
| 4,317,179 | 2/1982 | Kato et al. ............................... 382/264 |
| 4,571,635 | 2/1986 | Mahmoodi et al. . |
| 5,319,549 | 6/1994 | Katsuragawa et al. .................. 382/132 |

FOREIGN PATENT DOCUMENTS

| | | | |
|---|---|---|---|
| 0 357 842 | 3/1990 | European Pat. Off. ......... | G06F 15/68 |
| 61-169971 | 7/1986 | Japan .............................. | G06F 15/62 |
| 4-64223 | 10/1992 | Japan .............................. | H04N 1/04 |
| WO 90/07751 | 7/1990 | WIPO ............................. | G06F 15/68 |

OTHER PUBLICATIONS

"Extraction of Microcalcifications on Mammogram Using Morphological Filter with Multiple Structuring Elements"; Hua–ROng JIN et al.; Collected Papers of the Institute of Electronics and Communication Engineers of Japan, D–II, vol. J75–D–II, No. 7, pp. 1170–1176, Jul. 1992.

"Basic Theory of Mathematical Morphology and It's Application to Mammogram Processing", Hidefumi Kobatake; Medical Imaging Technology, vol. 12, No. 1, Jan. 1994, pp. 59–66.

*Primary Examiner*—Scott Rogers
*Attorney, Agent, or Firm*—Sughrue, Mion, Zinn Macpeak & Seas, PLLC

[57] ABSTRACT

A morphology operation is carried out on an original image signal representing a radiation image, and a morphology signal is thereby obtained. An edge signal, which represents a characteristic value with respect to an image edge portion in the radiation image, or a specific image signal, which represents a characteristic value with respect to a specific image portion having a contour of a predetermined size, is obtained from the morphology signal and the original image signal. An emphasis coefficient corresponding to the edge signal or the specific image signal is calculated from a conversion table. The conversion table is set such that the emphasis coefficient may take a positive value when the value of the edge signal or the specific image signal is larger than a predetermined threshold value. The conversion table is corrected such that, as a dose of radiation delivered during an operation for recording the radiation image becomes small, the threshold value may become large.

6 Claims, 6 Drawing Sheets

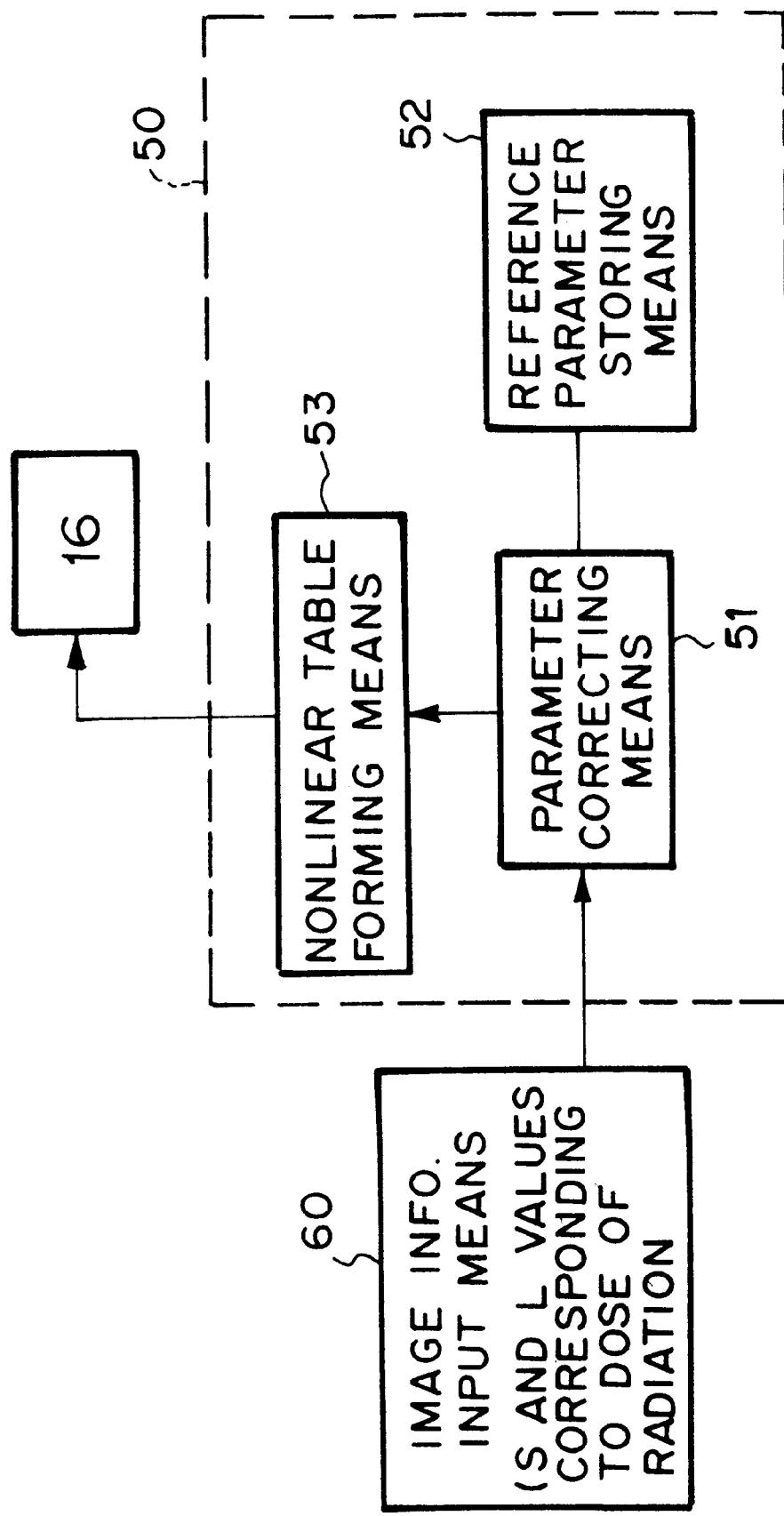

IMAGE EMPHASIS PROCESSING METHOD AND APPARATUS

BACKGROUND OF THE INVENTION

1. Field of the Invention

This invention relates to an image emphasis processing method and apparatus. This invention particularly relates to a method and apparatus, wherein a degree of image emphasis is adjusted.

2. Description of the Prior Art

Image processing, such as gradation processing or frequency processing, has heretofore been carried out on an image signal (i.e., an original image signal), which represents an original image having been obtained with one of various image obtaining methods, such that a visible image having good image quality can be reproduced and used as an effective tool in, particularly, the accurate and efficient diagnosis of an illness. Particularly, in the field of medical images, such as radiation images of human bodies serving as objects, it is necessary for specialists, such as doctors, to make an accurate diagnosis of an illness or an injury of the patient in accordance with the obtained image. Therefore, it is essential to carry out the image processing in order that a visible image having good image quality can be reproduced and used as an effective tool in the accurate and efficient diagnosis of an illness.

As one of the image processing, frequency emphasis processing has been disclosed in, for example, Japanese Unexamined Patent Publication No. 61(1986)-169971. With the disclosed frequency emphasis processing, an original image signal Sorg, which may represent the image density value, or the like, of an original image, is converted into a processed image signal Sproc with Formula (1) shown below.

$$Sproc = Sorg + \beta \times (Sorg - Sus) \tag{1}$$

In Formula (1), $\beta$ represents the frequency emphasis coefficient, and Sus represents the unsharp mask signal. The unsharp mask signal Sus comprises super-low frequency components obtained by setting a mask, i.e. an unsharp mask, constituted of a picture element matrix, which has a size of N columns×N rows (wherein N represents an odd number) and has its center at the picture element represented by the original image signal Sorg, in a two-dimensional array of picture elements of the image. The unsharp mask signal Sus is calculated with, for example, Formula (2) shown below.

$$Sus = (\Sigma\Sigma Sorg)/N^2 \tag{2}$$

wherein $\Sigma\Sigma Sorg$ represents the sum of the original image signal values representing the picture elements located within the unsharp mask.

The value of (Sorg–Sus) in the parenthesis of the second term of Formula (1) is obtained by subtracting the unsharp mask signal Sus, which represents the super-low frequency components, from the original image signal Sorg. Therefore, the value of (Sorg–Sus) represents the comparatively high frequency components, which have been extracted selectively by eliminating the super-low frequency components from the original image signal Sorg.

The comparatively high frequency components are then multiplied by the frequency emphasis coefficient $\beta$, and the obtained product is added to the original image signal Sorg. In this manner, of the original image, only the comparatively high frequency components can be selectively and relatively subjected to emphasis or restriction (adjustment of sharpness).

Also, processing based upon the algorithm of morphology (hereinbelow referred to as the morphology operation or the morphology processing) has heretofore been known as the operation processing for selectively extracting only a specific image portion, such as an abnormal pattern, or an image edge portion from an original image.

The morphology processing has been studied as a technique efficient for detecting, particularly, a small calcified pattern, which is one of characteristic forms of mammary cancers. However, the image to be processed with the morphology processing is not limited to the small calcified pattern in a mammogram, and the morphology processing is applicable to any kind of image, in which the size and the shape of a specific image portion (i.e., an abnormal pattern, or the like) to be detected are known previously.

The morphology processing is carried out by using a structure element (also referred to as a mask) B, which is set in accordance with the size of the image portion to be extracted, and a multi-scale $\lambda$. The morphology processing has the features in that, for example, (1) it is efficient for extracting a calcified pattern itself, (2) it is not affected by complicated background information, and (3) the extracted calcified pattern does not become distorted.

Specifically, the morphology processing is advantageous over ordinary differentiation processing in that it can more accurately detect the geometrical information concerning the size, the shape, and the image density distribution of the calcified pattern. How the morphology processing is carried out will be described hereinbelow by taking the detection of a small calcified pattern in a mammogram as an example.

Fundamental Operation of Morphology Processing

In general, the morphology processing is expanded as the theory of sets in an N-dimensional space. As an aid in facilitating the intuitive understanding, the morphology processing will be described hereinbelow with reference to a two-dimensional gray level image.

The gray level image is considered as a space, in which a point having coordinates (x, y) has a height corresponding to an image density value f(x, y). In this case, it is assumed that the image signal representing the image density value f(x, y) is a high luminance-high signal level type of image signal, in which a low image density (i.e., a high luminance when the image is displayed on a CRT display device) is represented by a high image signal level.

Firstly, as an aid in facilitating the explanation, a one-dimensional function f(x) corresponding to the cross-section of the two-dimensional gray level image is considered. It is assumed that a structure element g (corresponding to the aforesaid structure element B) used in the morphology operation is a symmetric function of Formula (3) shown below, which is symmetric with respect to the origin.

$$g^s(x) = g(-x) \tag{3}$$

It is also assumed that the value is 0 in a domain of definition G, which is represented by Formula (4).

$$G = \{-m, -m+1, \ldots, -1, 0, 1, \ldots, m-1, m\} \tag{4}$$

In such cases, the fundamental forms of the morphology operation are very simple operations carried out with Formulas (5), (6), (7), and (8) shown below.

$$\text{dilation; } [f \oplus G^s](i) = \max\{f(i-m), \ldots, f(i), \ldots, f(i+m)\} \quad (5)$$

$$\text{erosion; } [f \ominus G^s](i) = \min\{f(i-m), \ldots, f(i), \ldots, f(i+m)\} \quad (6)$$

$$\text{opening; } f_g = (f \ominus g^s) \oplus g \quad (7)$$

$$\text{closing; } f^g = (f \oplus g^s) \ominus g \quad (8)$$

Specifically, as illustrated in FIG. 4A, the dilation processing is the processing for retrieving the maximum value in the region of a width of ±m (which width is the value determined in accordance with the structure element B and corresponds to the mask size shown in FIG. 4A) having its center at a picture element of interest. As illustrated in FIG. 4B, the erosion processing is the processing for retrieving the minimum value in the region of the width of ±m having its center at the picture element of interest. Therefore, the dilation processing is also referred to as the maximum value processing, and the erosion processing is also referred to as the minimum value processing.

The opening processing is equivalent to the processing in which the dilation processing is carried out after the erosion processing, i.e., the processing in which the maximum value is searched after the searching of the minimum value. Also, the closing processing is equivalent to the processing in which the erosion processing is carried out after the dilation processing, i.e., the processing in which the minimum value is searched after the searching of the maximum value.

More specifically, as illustrated in FIG. 4C, the opening processing is equivalent to the processing for smoothing the image density curve f(x) from the low luminance side, and removing a convex image density fluctuating portion (i.e., the portion at which the luminance is higher than that of the surrounding portions), which fluctuates in a region spatially narrower than the mask size of 2 m. Also, as illustrated in FIG. 4D, the closing processing is equivalent to the processing for smoothing the image density curve f(x) from the high luminance side, and removing a concave image density fluctuating portion (i.e., the portion at which the luminance is lower than that of the surrounding portions), which fluctuates in the region spatially narrower than the mask size of 2 m.

In cases where the structure element g is not symmetric with respect to the origin, the dilation operation with Formula (5) is referred to as the Minkowski sum, and the erosion operation with Formula (6) is referred to as the Minkowski difference.

In cases where the image signal representing the image density value f(x) is a high image density-high signal level type of image signal, in which a high image density is represented by a high image signal level, the relationship between the image density value f(x) and the image signal value becomes reverse to the relationship between the image density value f(x) and the image signal value in the high luminance-high image signal level type of image signal. Therefore, the dilation processing, which is carried out on the high image density-high signal level type of image signal, coincides with the erosion processing, which is carried out on the high luminance-high signal level type of image signal as shown in FIG. 4B. The erosion processing, which is carried out on the high image density-high signal level type of image signal, coincides with the dilation processing, which is carried out on the high luminance-high signal level type of image signal as shown in FIG. 4A. The opening processing, which is carried out on the high image density-high signal level type of image signal, coincides with the closing processing, which is carried out on the high luminance-high signal level type of image signal as shown in FIG. 4D. Also, the closing processing, which is carried out on the high image density-high signal level type of image signal, coincides with the opening processing, which is carried out on the high luminance-high signal level type of image signal as shown in FIG. 4C.

Each of the signals, which are obtained from the aforesaid morphology processing (i.e., the dilation processing, the erosion processing, the opening processing, and the closing processing), (each of the signals having the profiles indicated by the broken lines in FIGS. 4A, 4B, 4C, and 4D) will hereinbelow be referred to as the morphology signal Smor.

The morphology processing is herein described with respect to the high luminance-high signal level type of image signal.

Application to Detection of Calcified Patterns

In order for a calcified pattern to be detected, it is considered to employ a difference method, in which a smoothed image signal is subtracted from the original image signal. However, with a simple smoothing method, it is difficult to discriminate the calcified pattern from an elongated non-calcified pattern (for example, a pattern of the mammary gland, a blood vessel, mammary gland supporting tissues, or the like). Therefore, Obata of Tokyo University of Agriculture and Technology, et al. have proposed a morphology filter, which is represented by Formula (9) and is based upon the opening operation using a multiply structure element. [Reference should be made to "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992; and "Fundamentals of Morphology and Its Application to Mammogram Processing," Medical Imaging Technology, Vol. 12, No. 1, January 1994.]

$$P = f - \max_{i \in (1, \ldots, M)} \{(f \ominus Bi) \oplus Bi\} \quad (9)$$

$$= f - \max_{i \in (1, \ldots, M)} \{f_{Bi}\}$$

In Formula (9), Bi (wherein i=1, 2, ..., M) represents M number of linear structure elements (M=4 in the example shown in FIG. 7). (The M number of structure elements, as a whole, will hereinbelow be referred to as the multiply structure element.) In cases where the structure element Bi is set to be larger than the calcified pattern to be detected, a calcified pattern, which is a convex signal change portion finer than the structure element Bi (i.e., which is an image portion fluctuating in a spatially narrow region) and has luminance values larger than the luminance values of the surrounding portions, is removed in the opening processing. On the other hand, an elongated non-calcified pattern is longer than the structure element Bi. Therefore, in cases where the inclination of the non-calcified pattern (i.e, the direction along which the non-calcified pattern extends) coincides with one of the directions of the four structure elements Bi, the non-calcified pattern remains unremoved after the opening processing, i.e. the operation of the second term of Formula (9), has been carried out. Therefore, when the smoothed image signal obtained from the opening processing (i.e. the signal representing the image, from which only the calcified pattern has been removed) is subtracted from the original image signal f, an image can be obtained which contains only the small calcified pattern. This is the concept behind Formula (9).

As described above, in cases where the image signal is of the high image density-high signal level type, the image density value of the calcified pattern is smaller than the image density values of the surrounding image portions, and the calcified pattern constitutes a concave signal change portion with respect to the surrounding portions. Therefore, the closing processing is applied in lieu of the opening processing, and Formula (10) shown below is applied in lieu of Formula (9).

$$P = \underset{i \in (1, ..., M)}{f - \min} \{(f \oplus Bi) \ominus Bi\} \quad (10)$$

$$= \underset{i \in (1, ..., M)}{f - \min} \{f^{Bi}\}$$

Also, in cases where the image signal obtained from the dilation processing or the erosion processing is subtracted from the original image signal in accordance with Formula (11) or (12) shown below, only the edge portion in the original image (illustrated in FIG. 4A or 4B) can be extracted selectively.

$$P = f - (f \oplus Bi) \quad (11)$$

$$P = f - (f \ominus Bi) \quad (12)$$

As described above, in order that a visible image having good image quality can be reproduced and used as an effective tool in, particularly, the accurate and efficient diagnosis of an illness, it is essential to carry out the image processing on the given image. However, in cases where the emphasis processing merely depending on the image density is carried out as disclosed in, for example, U.S. Pat. No. 4,315,318, components adversely affecting the image quality, such as radiation noise components in a mammogram, are also emphasized. As a result, the image quality of the image and its capability of serving as an effective tool in, particularly, the efficient and accurate diagnosis of an illness become low.

Also, as disclosed in, for example, U.S. Pat. No. 4,571,635, EP 357842 B1, and WO 90/07751, in cases where emphasis processing depending upon the value of variance of an image signal is carried out, an image portion having a locally large change in image density is emphasized to a high extent. Therefore, the problems occur in that undershooting and overshooting become relatively perceptible in the vicinity of the image portion. Particularly, as for X-ray images, an artifact is apt to occur on the high image density side.

Accordingly, the applicant proposed image processing methods, wherein emphasis depending upon the morphology signal obtained from each morphology operation described above is carried out, wherein components unnecessary for a diagnosis, or the like, such as noise components, are not emphasized, and wherein only a specific image portion of interest is emphasized efficiently. The proposed image processing methods are described in U.S. Ser. No. 08/623,223.

In the proposed image processing methods, the emphasis coefficient $\beta$ in Formula (1) shown above is set to be a function of a signal (i.e., a specific image signal) Scalc, which represents a specific image portion and may be represented by Formula (13) having the same meaning as that of Formula (9) or (10) shown above, or a function of a signal (i.e., an edge signal) Sedge, which represents an image edge portion and may be represented by Formula (14) having the same meaning as that of Formula (11) or (12) shown above. By way of example, the emphasis coefficient $\beta$ may be represented by a nonlinear conversion table, which is indicated by the solid line in FIG. 2.

$$S_{calc} = |S_{org} - S_{mor}| \quad (13)$$

$$\text{wherein } S_{mor} = \max(S_{org} \ominus Bi) \oplus Bi \quad (13')$$

$$\text{or } S_{mor} = \min(S_{org} \oplus Bi) \ominus Bi \quad (13'')$$

$$S_{edge} = |S_{org} - S_{mor}| \quad (14)$$

$$\text{wherein } S_{mor} = S_{org} \oplus Bi \quad (14')$$

$$\text{or } S_{mor} = S_{org} \ominus Bi \quad (14'')$$

The conversion table is set previously such that the value of the emphasis coefficient $\beta$ may change from 0 to a positive value when the edge signal Sedge or the specific image signal Scalc takes a value larger than a predetermined threshold value A, and such that the value of the emphasis coefficient $\beta$ may be fixed to be 1 when the edge signal Sedge or the specific image signal Scalc takes a value larger than a predetermined threshold value B.

The threshold value A is a value, which separates noise components and components representing a true image edge portion in the edge signal Sedge from each other, or a value, which separates noise components and components representing a true specific image portion in the specific image signal Scalc from each other. As the threshold value A, an appropriate value is set previously based upon results of experiments.

The threshold value B is a value for restraining the emphasis coefficient $\beta$ from increasing monotonously in accordance with an increase in the value of the edge signal Sedge or the specific image signal Scalc. As the threshold value B, an appropriate value is set previously based upon results of experiments.

Values of the edge signal Sedge or the specific image signal Scalc due to noise components are smaller than the values of the edge signal Sedge, which represents the true image edge portion, or the values of the specific image signal Scalc, which represents the specific image portion. Therefore, with the proposed image processing methods, even if noise components are contained in the morphology signal Smor, the value of the emphasis coefficient $\beta$ with respect to the noise components is set to be zero, and the noise components are not emphasized. Accordingly, only the specific image portion, such as a calcified pattern having a size smaller than the structure element, and the edge portion in the image can be selectively emphasized with a high accuracy. Such effects could not be obtained in the past.

However, with the aforesaid image processing method having been proposed by the applicant, it may rarely occur that noise components are emphasized.

Specifically, for example, such that a dose of radiation given to an object may be restricted, a radiation image of the object may be recorded with a comparatively small dose of radiation. As for such an original image, the values of noise components contained in the original image become larger than the values of noise components, which are contained in an original image having been recorded with a dose of radiation for obtaining an image having optimum image quality.

As for the original image containing noise components having comparatively large values, the values of the edge signal Sedge or the specific image signal Scalc due to the noise components become comparatively large. Therefore, the values of the edge signal Sedge or the specific image signal Scalc due to the noise components may take values larger than the aforesaid threshold value A. In such cases, the problems occur in that the noise components are emphasized.

SUMMARY OF THE INVENTION

The primary object of the present invention is to provide an image emphasis processing method, wherein only a specific image portion, such as a calcified pattern, and/or an image edge portion is selectively emphasized with a high accuracy regardless of a dose of radiation delivered during an operation for recording a radiation image.

Another object of the present invention is to provide an apparatus for carrying out the image emphasis processing method.

An image emphasis processing method and apparatus in accordance with the present invention are characterized by correcting a conversion table for calculating a value of an emphasis coefficient, which corresponds to an edge signal Sedge, and/or a conversion table for calculating a value of an emphasis coefficient, which corresponds to an specific image signal Scalc, the correction being made in accordance with a dose of radiation delivered during an operation for recording a radiation image, such that only an image edge portion and/or a specific image portion, such as a calcified pattern, may be accurately separated from noise and emphasized.

Specifically, the present invention provides an image emphasis processing method, comprising the steps of:

i) carrying out a morphology operation on an original image signal representing a radiation image, a morphology signal being obtained from the morphology operation, ii) obtaining an edge signal [Sedge represented by Formula (14)], which represents a characteristic value with respect to an image edge portion embedded in the radiation image, and/or a specific image signal [Scalc represented by Formula (13)], which represents a characteristic value with respect to a specific image portion having a contour of a predetermined size, the specific image portion being embedded in the radiation image, the edge signal and/or the specific image signal being obtained from the morphology signal and the original image signal, iii) calculating an emphasis coefficient, which corresponds to the edge signal, from a conversion table having been set previously, and/or calculating an emphasis coefficient, which corresponds to the specific image signal, from a conversion table having been set previously, and iv) selectively emphasizing the image edge portion in accordance with the emphasis coefficient, which corresponds to the edge signal, and image signal values of the original image signal representing the image edge portion, and/or selectively emphasizing the specific image portion in accordance with the emphasis coefficient, which corresponds to the specific image signal, and image signal values of the original image signal representing the specific image portion, wherein the conversion table for the calculation of the emphasis coefficient, which corresponds to the edge signal, is set such that the emphasis coefficient may take a positive value when the value of the edge signal is larger than a predetermined threshold value, and/or the conversion table for the calculation of the emphasis coefficient, which corresponds to the specific image signal, is set such that the emphasis coefficient may take a positive value when the value of the specific image signal is larger than a predetermined threshold value, and wherein the conversion table for the calculation of the emphasis coefficient, which corresponds to the edge signal, and/or the conversion table for the calculation of the emphasis coefficient, which corresponds to the specific image signal, is corrected such that, as a dose of radiation delivered during an operation for recording the radiation image becomes small, the corresponding threshold value may become large.

By way of example, as each of the conversion tables, a nonlinear table indicated by the solid line in FIG. 2 may be employed. Also, the term "image portion having a contour" as used herein means, for example, an abnormal pattern, such as a calcified pattern. This term does not mean a mere image edge portion, at which the change in image density is sharp, and means the closed image portion, which is surrounded by such an image edge portion.

Further, the term "predetermined threshold value" as used herein means a threshold value A illustrated in FIG. 2. In the image emphasis processing method in accordance with the present invention, each of the conversion tables is corrected such that, as the dose of radiation delivered during the operation for recording the radiation image becomes small, the corresponding threshold value A may become large. In the same manner as that in the threshold value A, as the dose of radiation delivered during the operation for recording the radiation image becomes small, a threshold value B shown in FIG. 2, at which the value of the emphasis coefficient β is fixed to be 1.0, may also be shifted to a large value.

Information representing the dose of radiation delivered during the operation for recording the radiation image may be inputted from a predetermined input means. Alternatively, the dose of radiation delivered during the operation for recording the radiation image may be calculated from the original image signal.

As a method for calculating the dose of radiation from the original image signal, a method based upon exposure data recognizer processing (EDR processing), which has been proposed by the applicant in, for example, Japanese Patent Publication No. 4(1992)-64223, should preferably be employed. With the EDR processing, a histogram of the original image signal is formed, and a read-out sensitivity (an S value) and a latitude (an L value) are calculated from the histogram. With the method based upon the EDR processing, a predetermined correction value C is calculated from the S value and the L value, which have been obtained from the EDR processing, by using Formulas (15), (16), (16'), and (17) shown below, which have been determined experimentally.

Specifically, firstly, the S value with respect to a reference image (i.e., an image having been recorded with an appropriate dose of radiation) is taken to be 50, and the L value with respect to the reference image is taken to be 2.0. Also, a constant q is calculated with Formula (15) shown below.

$$q = S^{1/2}/(7 \times L) \tag{15}$$

An appropriate threshold value Ttype is then calculated from a constant P (=1.533) by using Formula (16) shown below.

$$Ttype = 12.27 \times P^q \qquad (16)$$

As a result, Ttype=15.23.

Thereafter, a value of q is calculated from the S value and the L value with respect to the original image, which is to be subjected to the image emphasis processing, by using Formula (15) shown above. Also, as in Formula (16) shown above, a threshold value TO appropriate for the original image is calculated with Formula (16') shown below.

$$TO = 12.27 \times P^q \qquad (16')$$

Further, the correction value C is calculated with Formula (17) shown below.

$$C = TO - Ttype \qquad (17)$$

In cases where the nonlinear table indicated by the solid line in FIG. 2 is employed as each of the conversion tables, the threshold value A is corrected with the correction value C described above. Specifically, the original conversion table indicated by the solid line in FIG. 2 is shifted by C, and a corrected conversion table, which is indicated by the broken line in FIG. 2, is thereby obtained. (In such cases, the threshold value B is simultaneously corrected in the same manner as that in the threshold value A.)

The present invention also provides an image emphasis processing apparatus, comprising:

i) a morphology operation means for carrying out a morphology operation on an original image signal representing a radiation image, a morphology signal being obtained from the morphology operation, ii) a specific image signal calculating means for obtaining an edge signal, which represents a characteristic value with respect to an image edge portion embedded in the radiation image, and/or a specific image signal, which represents a characteristic value with respect to a specific image portion having a contour of a predetermined size, the specific image portion being embedded in the radiation image, the edge signal and/or the specific image signal being obtained from the morphology signal and the original image signal, iii) a conversion table, in which the edge signal and a corresponding emphasis coefficient have been set previously, and/or a conversion table, in which the specific image signal and a corresponding emphasis coefficient have been set previously, and iv) an image emphasis processing means for selectively emphasizing the image edge portion in accordance with the emphasis coefficient, which corresponds to the edge signal, and image signal values of the original image signal representing the image edge portion, and/or selectively emphasizing the specific image portion in accordance with the emphasis coefficient, which corresponds to the specific image signal, and image signal values of the original image signal representing the specific image portion, wherein the conversion table, in which the edge signal and the corresponding emphasis coefficient have been set previously, is s et such that the emphasis coefficient may take a positive value when the value of the edge signal is larger than a predetermined threshold value, and/or the conversion table, in which the specific image signal and the corresponding emphasis coefficient have been set previously, is set such that the emphasis coefficient may take a positive value when the value of the specific image signal is larger than a predetermined threshold value, and wherein the apparatus further comprises a correction means for correcting the conversion table, in which the edge signal and the corresponding emphasis coefficient have been set previously, and/or the conversion table, in which the specific image signal and the corresponding emphasis coefficient have been set previously, the correction being made such that, as a dose of radiation delivered during an operation for recording the radiation image becomes small, the corresponding threshold value may become large.

In order to specify the dose of radiation delivered during the operation for recording the radiation image, the image emphasis processing apparatus in accordance with the present invention may further comprise a radiation dose input means for inputting the information representing the dose of radiation delivered during the operation for recording the radiation image, or a radiation dose calculating means for calculating the dose of radiation from the original image signal.

In the image emphasis processing method and apparatus in accordance with the present invention, in cases where the original image signal is of the high image density-high signal level type and the specific image portion to be emphasized is a calcified pattern, the signal value of the calcified pattern is smaller than the signal values of the surrounding image portions. Therefore, in such cases, the closing processing [represented by Formula (13")], in which the minimum value is searched after the searching of the maximum value, may be carried out.

Also, in cases where the original image signal is of the high luminance-high signal level type and the specific image portion to be emphasized is a calcified pattern, the signal value of the calcified pattern is larger than the signal values of the surrounding image portions. Therefore, in such cases, the opening processing [represented by Formula (13')], in which the maximum value is searched after the searching of the minimum value, may be carried out.

As a structure element which is used when the morphology operation is carried out in accordance with the present invention, a multiply structure element may be employed. It is also possible to employ a single structure element, for example, a bisymmetric element having a form of a square, a rectangle, a circle, an ellipse, a rhombus, or the like.

With the image processing method and apparatus in accordance with the present invention, the conversion table for the edge signal Sedge and the emphasis coefficient and/or the conversion table for the specific image signal Scalc and the emphasis coefficient is corrected in accordance with the dose of radiation delivered during the operation for recording the radiation image. Therefore, even if the original image has been recorded with a small dose of radiation and therefore contains comparatively high levels of radiation noise, the edge portion in the image and the specific image portion, such as a calcified pattern, can be accurately separated from noise and emphasized.

Specifically, in the image having been recorded with a small dose of radiation, the levels of radiation noise components become comparatively high. Also, the values of the edge signal Sedge and the specific image signal Scalc due to noise components become comparatively large. In such cases, the conversion table for the edge signal Sedge and the emphasis coefficient and/or the conversion table for the specific image signal Scalc and the emphasis coefficient is corrected such that, as the dose of radiation delivered during the operation for recording the radiation image becomes small, the conversion table may be shifted to the direction that restricts the increase in the value of the emphasis coefficient. As a result, the emphasis coefficient can be prevented from becoming large due to an increase in the levels of noise components.

BRIEF DESCRIPTION OF THE DRAWINGS

FIG. 3 is a block diagram showing a correction means and an image information input means.

DESCRIPTION OF THE PREFERRED EMBODIMENTS

The present invention will hereinbelow be described in further detail with reference to the accompanying drawings.

Figure 1:
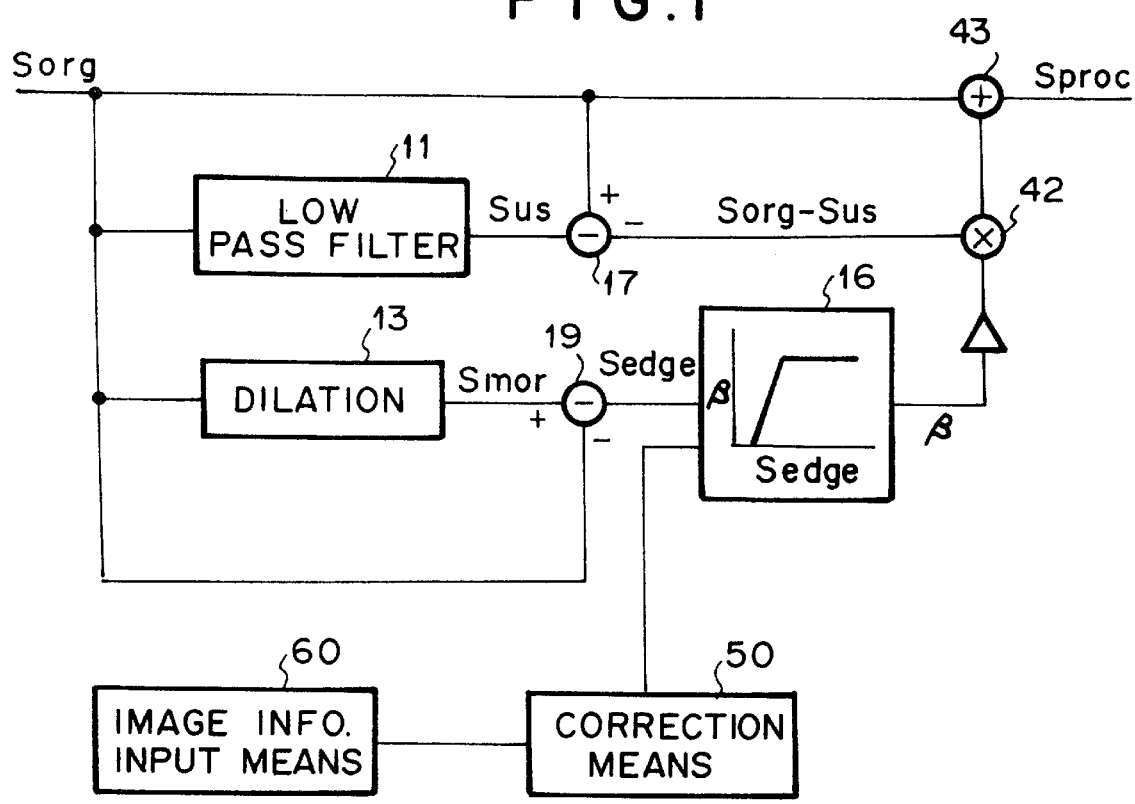
FIG. 1 is a block diagram showing a first embodiment of the image emphasis processing apparatus in accordance with the present invention.

FIG. 1 is a block diagram showing a first embodiment of the image emphasis processing apparatus in accordance with the present invention. The image emphasis processing apparatus illustrated in FIG. 1 carries out image processing on an image signal, which represents an X-ray image, and selectively emphasizes an image edge portion, at which the image density value changes sharply.

With reference to FIG. 1, the image emphasis processing apparatus comprises a low pass filter 11 for obtaining an unsharp mask signal Sus, which is represented by Formula (2) and corresponds to super-low frequency, from an original image signal Sorg, which is an image density signal (a high image density-high signal level type of image signal) representing an image. The image emphasis processing apparatus also comprises a subtracter 17 for subtracting the unsharp mask signal Sus from the original image signal Sorg and thereby extracting comparatively high frequency components (Sorg−Sus). The image emphasis processing apparatus further comprises a morphology operation means 13 for carrying a dilation processing on the original image signal Sorg and thereby obtaining a morphology signal Smor, which is represented by Formula (14'). The image emphasis processing apparatus still further comprises a subtracter 19 for subtracting the original image signal Sorg from the morphology signal Smor and thereby obtaining an edge signal Sedge, which is represented by Formula (14). The image emphasis processing apparatus also comprises a conversion table 16, in which the edge signal Sedge and the corresponding emphasis coefficient $\beta$ have been set, and a correction means 50 for correcting the conversion table 16 in accordance with an S value and an L value, which are inputted from an image information input means 60. The image emphasis processing apparatus further comprises a multiplier 42 for multiplying the high frequency components (Sorg−Sus) by the emphasis coefficient $\beta$, and an adder 43 for adding the product, which has been obtained from the multiplier 42, and the original image signal Sorg to each other.

Figure 2:
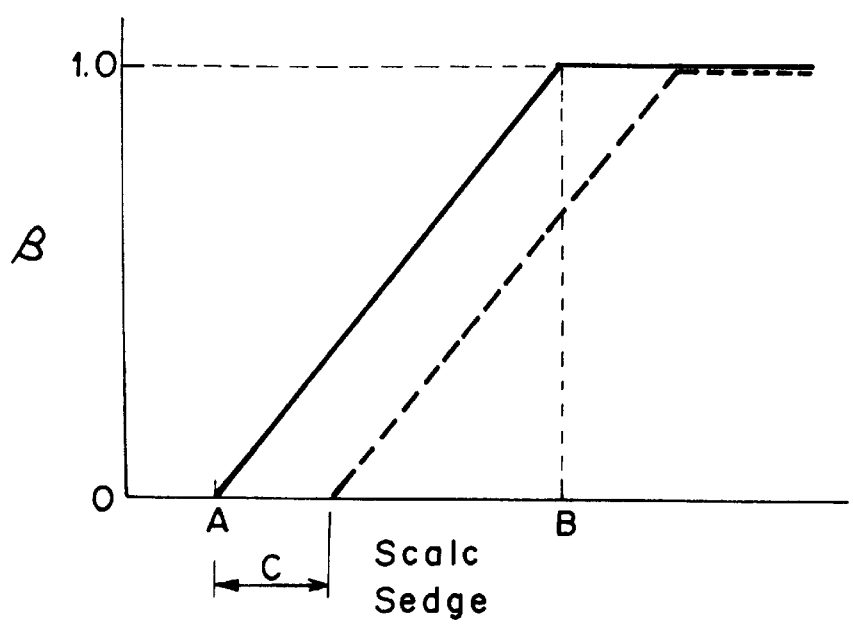
FIG. 2 is a graph showing an example of a conversion table.

The conversion table 16 is indicated by the solid line in FIG. 2. As illustrated in FIG. 2, the emphasis coefficient $\beta$ takes a value of 0 with respect to the value of the edge signal Sedge falling within the range of 0 to the threshold value A. With respect to the value of the edge signal Sedge falling within the range of the threshold value A to the threshold value B, the value of the emphasis coefficient $\beta$ increases monotonously along a straight line as the value of the edge signal Sedge becomes large. With respect to the value of the edge signal Sedge larger than the threshold value B, the value of the emphasis coefficient $\beta$ is fixed to be 1. Each of the threshold value A and the threshold value B is determined experimentally for a reference image, which has been recorded with an appropriate dose of radiation. The threshold value A is set to be a value appropriate for the processing such that the image edge portion may be emphasized ($\beta>0$) and radiation noise may not be emphasized ($\beta=0$). In cases where the edge signal Sedge takes a comparatively large value, the high frequency components (Sorg−Sus) also take large values. Therefore, the threshold value B is set to be a value appropriate for restricting excessive emphasis.

Information representing the threshold values A and B for the reference image, which has been recorded with the appropriate dose of radiation, is stored in a reference parameter storing means 52 of the correction means 50, which will be described later.

The image information input means 60 receives the original image signal Sorg and carries out the EDR processing. With the EDR processing, the read-out sensitivity (the S value) and the latitude (the L value), which correspond to the dose of radiation delivered during the operation for recording the X-ray image subjected to the image emphasis processing (the dose of radiation with which the X-ray image was recorded), are calculated. The image information input means 60 feeds the information, which represents the S value and the L value, into the correction means 50.

As illustrated in FIG. 3, the correction means 50 comprises the reference parameter storing means 52 for storing the initial values of the threshold values (parameters) A and B, which define the conversion table 16. The correction means 50 also comprises a parameter correcting means 51 for calculating a predetermined correction value C from the S value and the L value, which are received from the image information input means 60, by using Formulas (15), (16), (16'), and (17) shown below. The parameter correcting means 51 corrects the threshold values A and B with the correction value C. The correction means 50 further comprises a nonlinear table forming means 53 for forming a new conversion table in accordance with the corrected threshold values.

$$q = S^{1/2}/(7 \times L) \tag{15}$$

$$Ttype = 12.27 \times P^q \tag{16}$$

$$TO = 12.27 \times P^q \tag{16'}$$

$$C = TO - Ttype \tag{17}$$

where P=1.533

In the correction means 50 in this embodiment, the image having been recorded with the appropriate dose of radiation, for which the initial S value is equal to 50 and the initial L value is equal to 2.0 (Ttype=15.23), is taken as reference.

How this embodiment operates will be described hereinbelow.

An original image signal Sorg representing an image, which was recorded with a dose of X-rays smaller than the dose of X-rays for the reference image, is fed into the low pass filter 11, the morphology operation means 13, the adder 43, the subtracter 17, and the subtracter 19.

Firstly, the low pass filter 11 calculates the unsharp mask signal Sus from the original image signal Sorg in accordance with Formula (2) shown below.

$$Sus = (\Sigma\Sigma Sorg)/N^2 \tag{2}$$

wherein ΣΣSorg represents the sum of the original image signal values representing the picture elements located within the unsharp mask.

Thereafter, the subtracter 17 subtracts the unsharp mask signal Sus from the original image signal Sorg and thereby extracts the comparatively high frequency components (Sorg−Sus). The high frequency components (Sorg−Sus) are fed into the multiplier 42.

Also, the morphology operation means 13 carries out the dilation processing on the received original image signal Sorg and thereby calculates the morphology signal Smor, which is represented by Formula (14'). As indicated by the broken line in FIG. 4A, the morphology signal Smor is the maximum value signal with respect to the image signal.

The X-ray image represented by the original image signal Sorg is the one which has been recorded with a dose of radiation smaller than the dose of radiation for the reference image. Therefore, the X-ray image contains radiation noise of a comparatively higher level than in the reference image. In the dilation processing with the morphology operation means 13, the maximum value processing is also carried out on the radiation noise. As a result, at a portion at which the radiation noise occurs, the morphology signal Smor takes a value larger than the value of the original image signal Sorg. However, since the signal fluctuation value (the amplitude) of the radiation noise is very small, the difference between the morphology signal Smor and the original image signal Sorg is small.

Figure 4A:
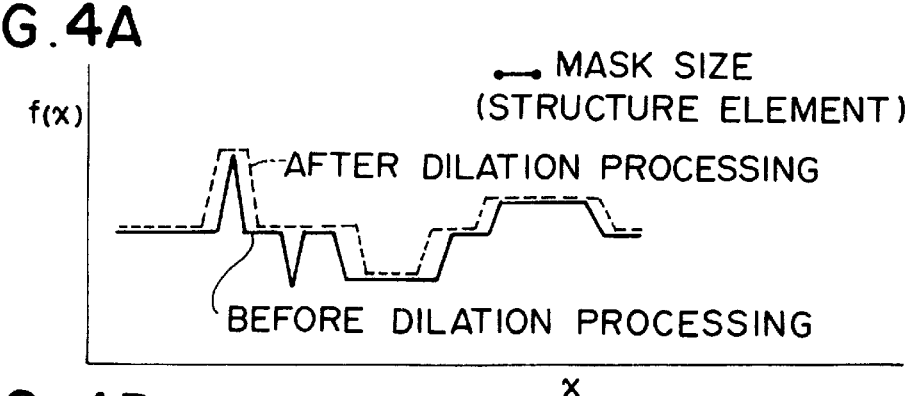
FIG. 4A is a graph showing how a dilation processing, which is one of fundamental morphology operations, is carried out.
Figure 4B:
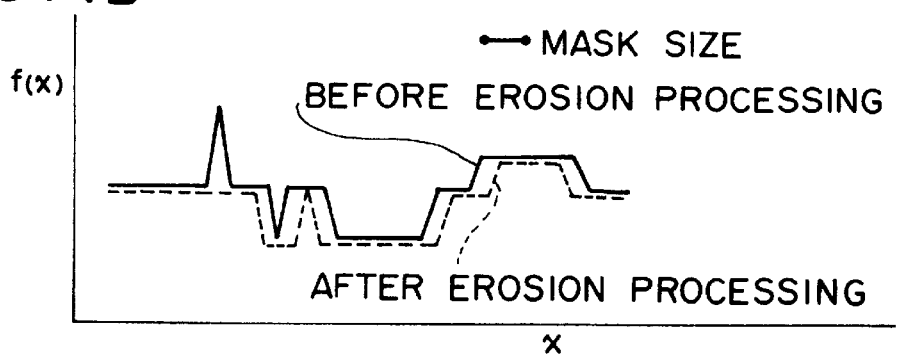
FIG. 4B is a graph showing how an erosion processing, which is one of fundamental morphology operations, is carried out.
Figure 4C:
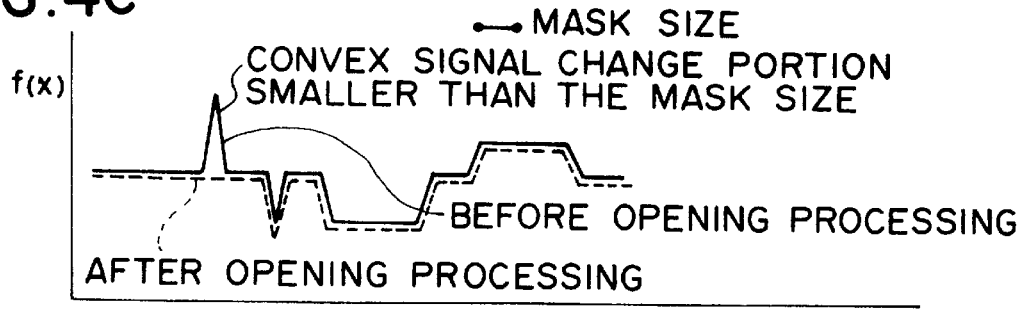
FIG. 4C is a graph showing how an opening processing, which is one of fundamental morphology operations, is carried out.

Thereafter, the subtracter 19 subtracts the original image signal Sorg from the morphology signal Smor and thereby calculates the edge signal Sedge. As illustrated in FIG. 4A, the edge signal Sedge represents a characteristic value with respect to the edge portion in the X-ray image and a concave image portion (e.g., a small calcified pattern), which is spatially narrower than the structure element. The edge signal Sedge is fed into the conversion table 16. In such cases, as described above, at a portion at which the radiation noise occurs, even if the radiation noise occurs in a flat portion, at which the fluctuation in image density is small, the difference between the morphology signal Smor and the original image signal Sorg is not equal to 0, and therefore the edge signal Sedge takes a positive value.

Initially, the conversion table 16 is set as indicated by the solid line in FIG. 2 in accordance with the threshold values A and B, which are stored in the reference parameter storing means 52. The threshold value A in the initial state has been set with respect to the reference image such that the edge signal Sedge due to the radiation noise can be appropriately separated from the edge signal Sedge with respect to the image edge portion. The threshold value A corresponds to Ttype=15.23.

Therefore, in cases where the image contains a comparatively high level of radiation noise as in the X-ray image, which is subjected to the image emphasis processing in this embodiment, it often occurs that the value of the edge signal Sedge due to the radiation noise becomes larger than the threshold value A. The problems will occur, depending upon the setting of the threshold value A, in that the edge signal Sedge due to the radiation noise cannot be accurately separated from the edge signal Sedge with respect to the image edge portion.

In order to eliminate the problems described above, the image information input means 60 carries out the EDR processing on the received original image signal Sorg and thereby calculates the S value and the L value with respect to the original image signal Sorg. The information representing the calculated S value and the calculated L value is fed into the correction means 50. In accordance with the received S value and the received L value, the correction means 50 sets a threshold value appropriate for accurately separating the edge signal Sedge due to the radiation noise from the edge signal Sedge with respect to the image edge portion in the image containing the comparatively high level of radiation noise.

Specifically, the parameter correcting means 51 of the correction means 50 calculates the predetermined correction value C from the S value and the L value, which have been received from the image information input means 60, and the value of Ttype, which is stored in the reference parameter storing means 52, by using Formulas (15), (16'), and (17) shown above. The parameter correcting means 51 makes a correction by adding the correction value C to the threshold values A and B. Also, the nonlinear table forming means 53 forms a new conversion table 16 (which is indicated by the broken line in FIG. 2) in accordance with the corrected threshold values.

The correction value C is calculated as the value for correcting the threshold values A and B into new threshold values such that the edge signal Sedge due to the radiation noise in the X-ray image subjected to the image emphasis processing can be accurately separated from the edge signal Sedge with respect to the image edge portion. Therefore, of the edge signal Sedge received from the subtracter 19, the edge signal Sedge due to the radiation noise is converted into the emphasis coefficient β having a value of 0, and the edge signal Sedge with respect to the image edge portion is converted into the emphasis coefficient β having a value larger than 0 and not larger than 1.

The information representing the emphasis coefficient β, which takes a value larger than 0 for only the edge signal Sedge with respect to the image edge portion, is fed into the multiplier 42. The multiplier 42 multiplies the high frequency components (Sorg−Sus), which have been received from the subtracter 17, by the emphasis coefficient β and thereby emphasizes the high frequency components (Sorg−Sus).

The emphasized high frequency components, β×(Sorg−Sus), are fed into the adder 43. The adder 43 adds the emphasized high frequency components, β×(Sorg−Sus), to the original image signal Sorg, and a processed image signal Sproc is thereby obtained.

In the processed image signal Sproc, of the original image signal Sorg, the high frequency components corresponding to the image edge portion are emphasized, and the high frequency components due to the radiation noise are not emphasized. Therefore, from the processed image signal Sproc, a visible image can be reproduced, which has good image quality and can serve as an effective tool in, particularly, the accurate and efficient diagnosis of an illness.

Figure 5:
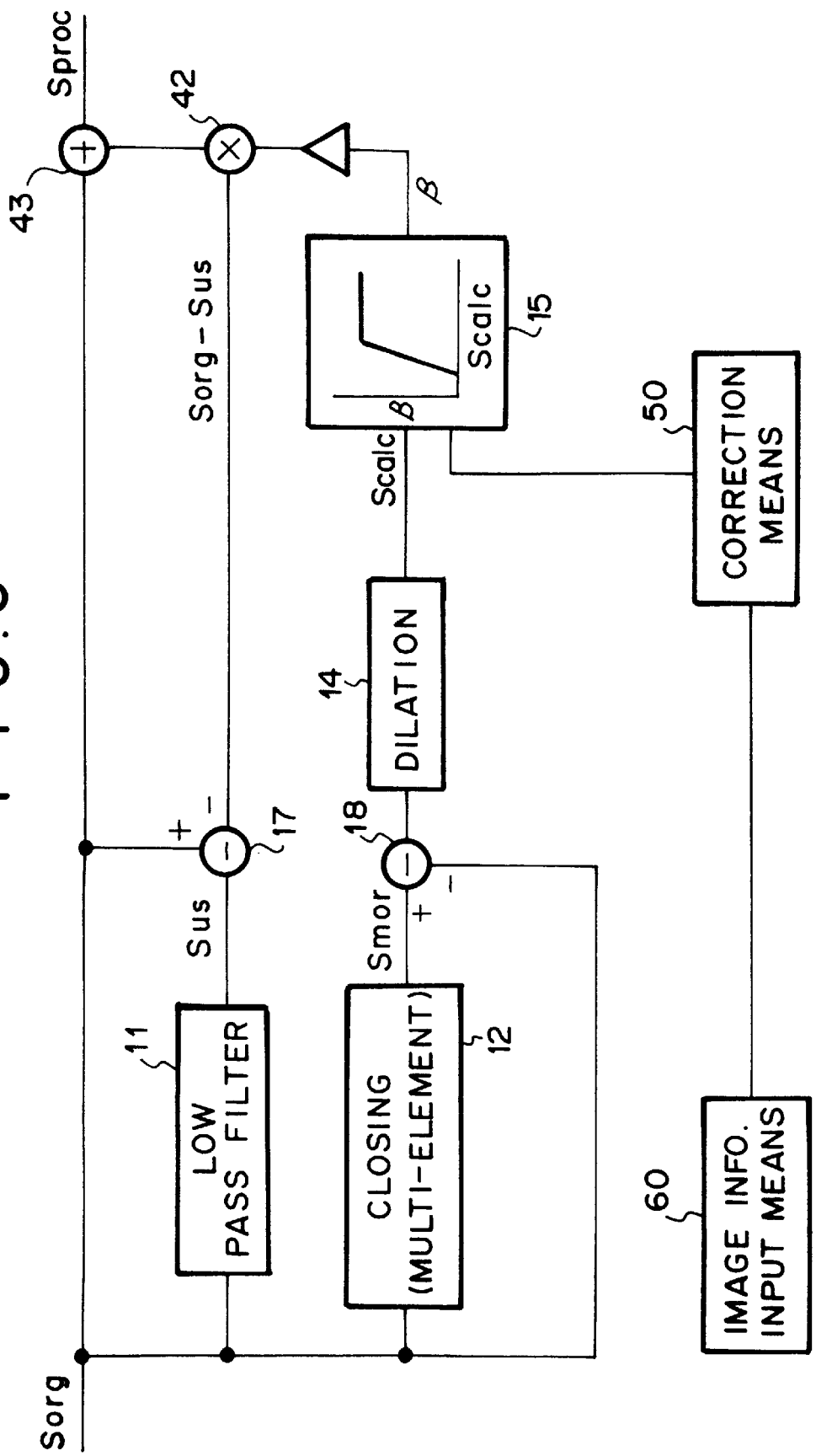
FIG. 5 is a block diagram showing a second embodiment of the image emphasis processing apparatus in accordance with the present invention.

FIG. 5 is a block diagram showing a second embodiment of the image emphasis processing apparatus in accordance with the present invention. In FIG. 5, similar elements are numbered with the same reference numerals with respect to FIG. 1. The second embodiment is identical with the first embodiment of FIG. 1, except for the points described below.

(1) As the morphology operation means, the second embodiment is provided with a morphology operation means 12 for carrying out a closing processing with a multiply structure element (multi-element) on the original image signal Sorg, and thereby calculating the morphology signal Smor represented by Formula (13") shown above.

(2) Since the multiply structure element is used in the morphology operation means 12, a plurality of morphology signals Smor are obtained by utilizing a plurality of structure elements. The second embodiment is also provided with a dilation processing means 14 for selecting the maximum value of the differences between the original image signal Sorg and the plurality of the morphology signals Smor.

Figure 4D:
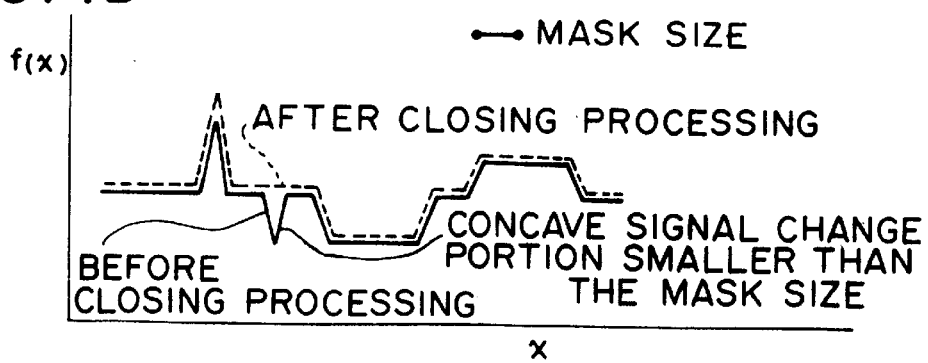
FIG. 4D is a graph showing how a closing processing, which is one of fundamental morphology operations, is carried out.

As described in (1) above, the second embodiment of the image emphasis processing apparatus in accordance with the present invention is provided with the morphology operation means 12 for carrying out the closing processing. The morphology operation means 12 calculates the morphology signal Smor represented by Formula (13") shown above from the received original image signal Sorg. As indicated by the broken line in FIG. 4D, the morphology signal Smor is the maximum value signal with respect to the original image signal Sorg. A subtracter 18 subtracts the original image signal Sorg from the morphology signal Smor and thereby calculates a specific image signal Scalc. As illustrated in FIG. 4D, the specific image signal Scalc represents a characteristic value with respect to a concave image portion (e.g., a small calcified pattern), which is spatially narrower than a structure element, in the X-ray image. The specific image signal Scalc is fed into a conversion table 15. In this embodiment, as described in (2) above, since the multiply structure element is used, a plurality of morphology signals Smor are obtained by utilizing a plurality of structure elements. From the plurality of the morphology signals Smor, the plurality of specific image signals Scalc are obtained. The dilation processing means 14 selects the maximum specific image signal Scalc from the plurality of specific image signals Scalc and feeds the maximum specific image signal Scalc into the conversion table 15.

The other operations are the same as those in the first embodiment. The portion, which is emphasized by the second embodiment, is the concave image portion, such as a small calcified pattern, which is spatially narrower than the structure element.

Figure 6:
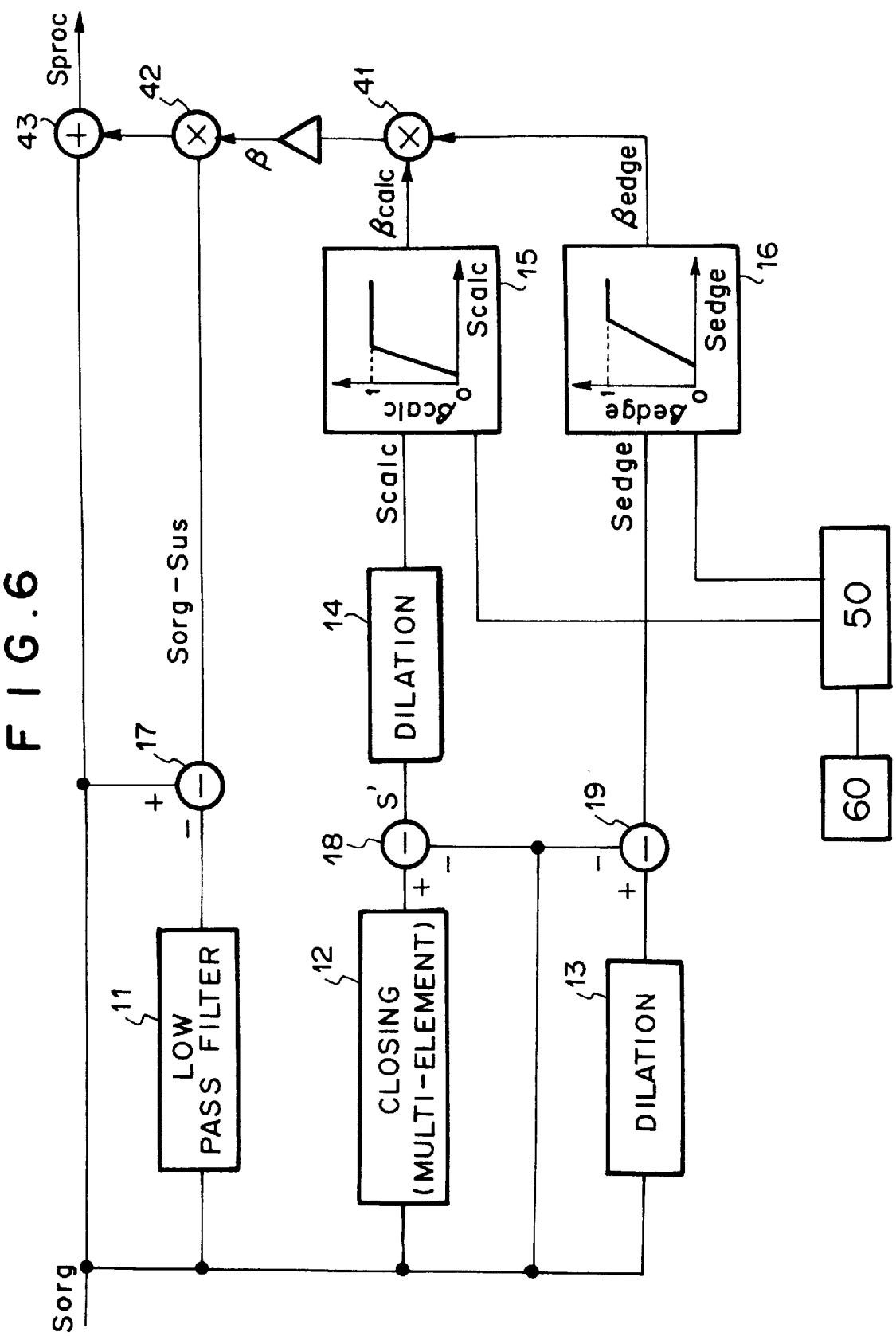
FIG. 6 is a block diagram showing a third embodiment of the image emphasis processing apparatus in accordance with the present invention.
Figure 7:
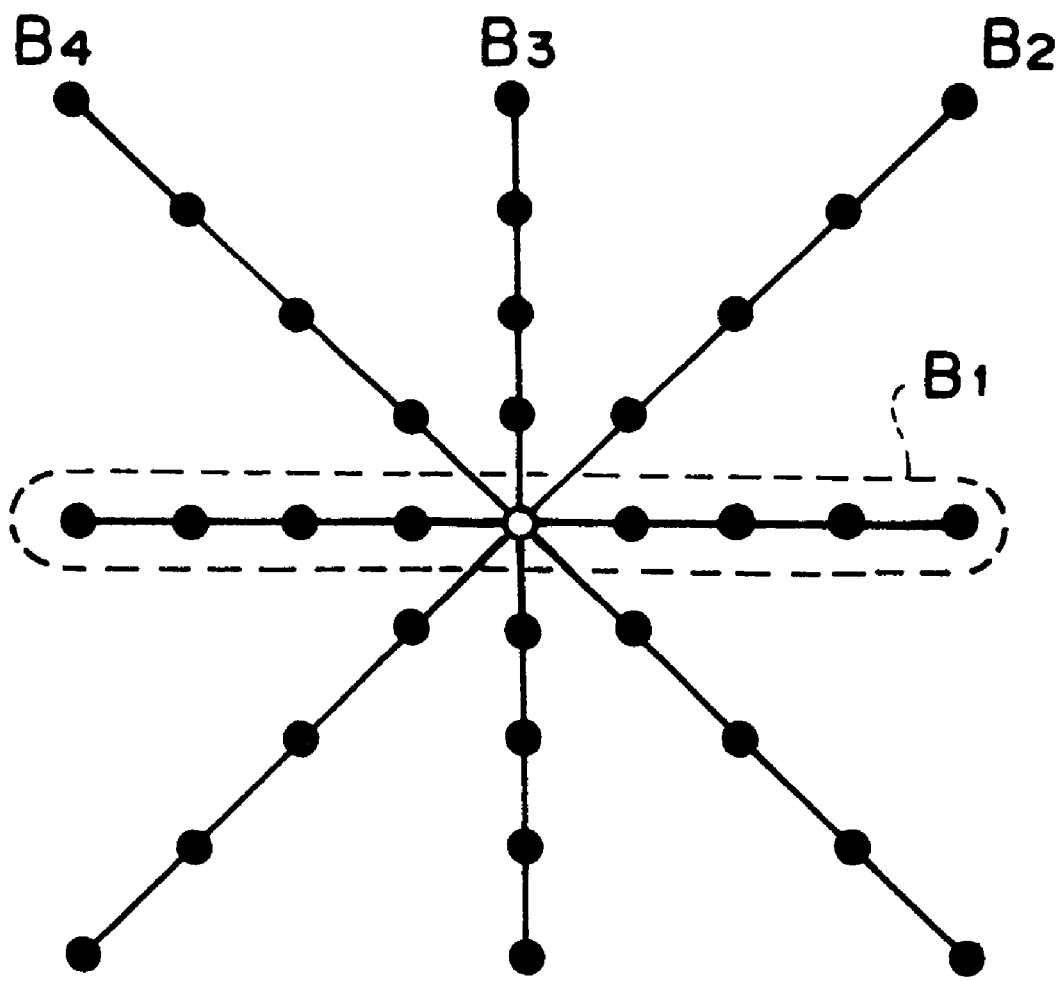
FIG. 7 is an explanatory view showing a multiply structure element Bi (where i=1, 2, ..., M; M=4) employed in a morphology filter.

FIG. 6 is a block diagram showing a third embodiment of the image emphasis processing apparatus in accordance with the present invention. In FIG. 6, similar elements are numbered with the same reference numerals with respect to FIG. 1 and FIG. 5. The third embodiment is obtained by combining the first embodiment of FIG. 1 and the second embodiment of FIG. 5 with each other. The constitution and the operations of the third embodiment are the same as those of the first and second embodiments. In the third embodiment, as illustrated in FIG. 6, an emphasis coefficient βcalc (which corresponds to the emphasis coefficient β calculated by the conversion table 15 shown in FIG. 5) is calculated by the conversion table 15. Also, an emphasis coefficient βedge (which corresponds to the emphasis coefficient β calculated by the conversion table 16 shown in FIG. 1) is calculated by the conversion table 16. A multiplier 41 multiplies the emphasis coefficient βcalc and the emphasis coefficient βedge by each other. The thus obtained product is employed as the emphasis coefficient β, by which the high frequency components (Sorg−Sus) are to be multiplied. In this manner, the problems can be prevented from occurring in that the high frequency components due to the radiation noise are emphasized by either one of the emphasis coefficients βcalc and βedge.

In the first, second, and third embodiments described above, as the means for correcting the threshold value in the conversion table, the correction means 50 for automatically correcting the threshold value in accordance with the original image signal Sorg is employed. Alternatively, a radiation dose input means for manually inputting the information, which represents the dose of radiation, may be provided, and a correction may be made in accordance with the dose of radiation, which is inputted from the radiation dose input means.

What is claimed is:

1. An image emphasis processing method, comprising the steps of:

i) carrying out a morphology operation on an original image signal representing a radiation image, a morphology signal being obtained from the morphology operation, ii) obtaining an edge signal, which represents a characteristic value with respect to an image edge portion embedded in the radiation image, and/or a specific image signal, which represents a characteristic value with respect to a specific image portion having a contour of a predetermined size, the specific image portion being embedded in the radiation image, the edge signal and/or the specific image signal being obtained from the morphology signal and the original image signal, iii) calculating an emphasis coefficient, which corresponds to the edge signal, from a conversion table having been set previously, and/or calculating an emphasis coefficient, which corresponds to the specific image signal, from a conversion table having been set previously, and iv) selectively emphasizing the image edge portion in accordance with the emphasis coefficient, which corresponds to the edge signal, and image signal values of the original image signal representing the image edge portion, and/or selectively emphasizing the specific image portion in accordance with the emphasis coefficient, which corresponds to the specific image signal, and image signal values of the original image signal representing the specific image portion, wherein the conversion table for the calculation of the emphasis coefficient, which corresponds to the edge signal, is set such that the emphasis coefficient may take a positive value when the value of the edge signal is larger than a predetermined threshold value, and/or the conversion table for the calculation of the emphasis coefficient, which corresponds to the specific image signal, is set such that the emphasis coefficient may take a positive value when the value of the specific image signal is larger than a predetermined threshold value, and wherein the conversion table for the calculation of the emphasis coefficient, which corresponds to the edge signal, and/or the conversion table for the calculation of the emphasis coefficient, which corresponds to the specific image signal, is corrected such that, as a dose of radiation delivered during an operation for recording the radiation image becomes small, the corresponding threshold value may become large.

2. A method as defined in claim 1 wherein information representing the dose of radiation delivered during the operation for recording the radiation image is inputted from a predetermined input means.

3. A method as defined in claim 1 wherein the dose of radiation delivered during the operation for recording the radiation image is calculated from the original image signal.

4. An image emphasis processing apparatus, comprising:

i) a morphology operation means for carrying out a morphology operation on an original image signal representing a radiation image, a morphology signal being obtained from the morphology operation, ii) a specific image signal calculating means for obtaining an edge signal, which represents a characteristic value with respect to an image edge portion embedded in the radiation image, and/or a specific image signal, which represents a characteristic value with respect to a specific image portion having a contour of a predetermined size, the specific image portion being embedded in the radiation image, the edge signal and/or the specific image signal being obtained from the morphology signal and the original image signal, iii) a conversion table, in which the edge signal and a corresponding emphasis coefficient have been set previously, and/or a conversion table, in which the specific image signal and a corresponding emphasis coefficient have been set previously, and iv) an image emphasis processing means for selectively emphasizing the image edge portion in accordance with the emphasis coefficient, which corresponds to the edge signal, and image signal values of the original image signal representing the image edge portion, and/or selectively emphasizing the specific image portion in accordance with the emphasis coefficient, which corresponds to the specific image signal, and image signal values of the original image signal representing the specific image portion, wherein the conversion table, in which the edge signal and the corresponding emphasis coefficient have been set previously, is set such that the emphasis coefficient may take a positive value when the value of the edge signal is larger than a predetermined threshold value, and/or the conversion table, in which the specific image signal and the corresponding emphasis coefficient have been set previously, is set such that the emphasis coefficient may take a positive value when the value of the specific image signal is larger than a predetermined threshold value, and wherein the apparatus further comprises a correction means for correcting the conversion table, in which the edge signal and the corresponding emphasis coefficient have been set previously, and/or the conversion table, in which the specific image signal and the corresponding emphasis coefficient have been set previously, said correction being made such that, as a dose of radiation delivered during an operation for recording the radiation image becomes small, the corresponding threshold value may become large.

5. An apparatus as defined in claim 4 wherein the apparatus further comprises a radiation dose input means for inputting the information representing the dose of radiation delivered during the operation for recording the radiation image.

6. An apparatus as defined in claim 4 wherein the apparatus further comprises a radiation dose calculating means for calculating the dose of radiation, which was delivered during the operation for recording the radiation image, from the original image signal.

* * * * *